United States Patent
Nicolas (12) 
(10) Patent No.: US 6,646,633 B1
(45) Date of Patent: Nov. 11, 2003

(54) METHOD AND SYSTEM FOR A FULL SCREEN USER INTERFACE AND DATA ENTRY USING SENSORS TO IMPLEMENT HANDWRITTEN GLYPHS

(75) Inventor: Regis Nicolas, Jacou (FR)

(73) Assignee: Palm Source, Inc., Sunnyvale, CA (US)

( * ) Notice: Subject to any disclaimer, the term of this patent is extended or adjusted under 35 U.S.C. 154(b) by 173 days.

(21) Appl. No.: 09/770,066

(22) Filed: Jan. 24, 2001

(51) Int. Cl.$^7$ ................................................. G09G 5/00
(52) U.S. Cl. ....................................... 345/173; 345/864
(58) Field of Search ................................ 345/184, 352, 345/173, 175, 178, 179, 864

(56) References Cited

U.S. PATENT DOCUMENTS

| | | | | |
|---|---|---|---|---|
| 5,777,605 A | * | 7/1998 | Yoshinobu et al. | 345/173 |
| 5,825,353 A | * | 10/1998 | Will | 345/184 |
| 5,825,675 A | * | 10/1998 | Want et al. | 708/142 |
| 5,864,635 A | * | 1/1999 | Zetts et al. | 382/187 |
| 5,896,126 A | * | 4/1999 | Shieh | 345/173 |
| 6,130,665 A | * | 10/2000 | Ericsson | 345/173 |
| 6,262,718 B1 | * | 7/2001 | Findlay et al. | 345/178 |
| 6,297,838 B1 | * | 10/2001 | Chang et al. | 345/863 |
| 6,429,846 B2 | * | 8/2002 | Rosenberg et al. | 345/156 |

* cited by examiner

Primary Examiner—Vijay Shankar
Assistant Examiner—Nitin Patel
(74) Attorney, Agent, or Firm—Wagner, Murabito & Hao LLP (57) ABSTRACT

A computer implemented method of implementing a touch screen user interface in conjunction with sensors for a computer system. A touchscreen area is provided for accepting text input strokes and for accepting icon manipulation strokes. A sensor is provided adjacent to the touchscreen area for registering sensor actuations from a user. In implementing the user interface, user input strokes are accepted into the touchscreen input area. User input strokes into touchscreen input area are interpreted as text input strokes when the sensor is actuated by the user during the user input strokes. User input strokes into the touchscreen input area are interpreted as icon manipulation strokes and not text input strokes when the sensor is not actuated by the user during the user input strokes. The nature of the sensor actuation is configured in order to require a deliberate touching, holding, grasping, or the like, to register an actuation of the sensor in order to distinguish between text input strokes and icon manipulation strokes, but not require so significant a user actuation as to interfere with a fluid and intuitive text entry process of the user. Interpreted input strokes can be rapidly displayed as characters on the touchscreen when the sensor is actuated by the user. An audible feedback can be generated to confirm the icon manipulation when the sensor is not actuated by the user. Similarly, a visual feedback can be generated to confirm the icon manipulation when the sensor is not actuated by the user.

20 Claims, 5 Drawing Sheets

METHOD AND SYSTEM FOR A FULL SCREEN USER INTERFACE AND DATA ENTRY USING SENSORS TO IMPLEMENT HANDWRITTEN GLYPHS

TECHNICAL FIELD

The present invention relates to a system and method by which computing devices may more easily recognize input from a user. In particular, the present invention relates to a system and method for implementing a full-screen user interface for data entry using handwritten glyphs.

BACKGROUND ART

As the components required to build a computer system have reduced in size, new categories of computer systems have emerged. One of the new categories of computer systems is the "palmtop" computer system. A palmtop computer system is a computer that is small enough to be held in the hand of a user. Most palmtop computer systems are used to implement various Personal Information Device (PID) applications such as an address book, a daily organizer, and electronic notepads.

Personal Information Devices include the class of computers, personal digital assistants and electronic organizers that tend both to be physically smaller than conventional computers and to have more limited hardware and data processing capabilities. PIDs include, for example, products sold by Palm, Inc. of Santa Clara, Calif., under such trademark as Pilot, and Pilot 1000, Pilot 5000, PalmPilot, PalmPilot Personal, PalmPilot Professional, Palm, and Palm III, Palm V, Palm VII, as well as other products sold under such trade names as WorkPad, Franklin Quest, and Franklin Convey.

PIDs are generally discussed, for example, in U.S. Pat. Nos. 5,125,0398; 5,727,202; 5,832,489; 5,884,323; 5,889,888; 5,900,875; 6,000,000; 6,006,274; and 6,034,686, which are incorporated herein by reference. PIDs typically include a screen and data processor, allowing the PID user to operate a substantial variety of applications relating to, for example: electronic mail, a calendar, appointments, contact data (such as address and telephone numbers), notebook records, expense reports, to do lists, or games. PIDs also often include substantial electronic memory for storing such applications as well as data entered by the user. Due to their substantial variety of applications and uses, personal information devices are becoming increasingly widely used.

Since PIDs and other similar palmtop computer systems are very small, keyboards are generally not efficient input devices. For example, PIDs with keyboards have keyboards that are so small that a user cannot touch-type. Furthermore, to use a keyboard a user must either place the PID system down onto a flat surface so the user can type with both hands or hold the PID system with two hands and type with thumbs only.

Instead of using a keyboard, many PIDs employ a stylus and a touchscreen or digitizer pad as an input system. The stylus and touchscreen combination works well for PIDs since the arrangement allows a user to hold the PID system in one hand while writing with the stylus onto the touchscreen with the other hand.

There is a problem, however, distinguishing between text entry from a user and the regular use of the stylus as a pointing device from the user. In both cases, the PID system has to recognize "touches" by the stylus onto the touchscreen and interpret the intentions of the user.

One prior art approach to this problem requires the use of two or more touchscreen areas, one area configured to recognize touches as the regular use of the stylus as a pointing device from the user, and another area configured to recognize touches as text input. Each touchscreen area is designed to register and recognize strokes from the stylus. In one embodiment, the PID system has an icon and menu touchscreen display area and a smaller text entry touchscreen display area. In such an embodiment, strokes entered in the icon and menu area are interpreted as icon and/or menu manipulations and strokes entered in the text entry area are interpreted as text characters and/or punctuation (e.g., handwriting glyphs and the like). The drawback with such a system is that it requires the partitioning of the display area. PID systems have a limited amount of the display area, and partitioning that limited amount into dedicated regions makes the display seemed even smaller.

Another prior approach is the use of software applications executing on the PID system whereby strokes in the icon and menu area of the PID can also be interpreted as text entry. Although this may solve the problem of imposing dedicated regions on the display, this prior art approach tends to greatly complicate the task of text entry. For example, with a typical PID interface, the act of tapping on the screen with the stylus means "click the thing on the screen where the user tapped." Unfortunately, the same act of tapping on the screen is also interpreted as text entry, such as, for example, "enter a punctuation mark" or "enter a punctuation shift." Thus, with the typical PID interface, the usual punctuation shift and similar text entry operations do not work, or are incorrectly interpreted by the PID system. Consequently, various types of "hybrid" approaches are resorted to, such as, for example, requiring the user tap for punctuation in a dedicated text entry area, which defeats the objective of eliminating the requirement of imposing dedicated regions on the touchscreen display.

Thus, what is required is a solution that eliminates the requirement for dedicated areas on a touchscreen display or digitizer pad that partition text entry user input from icon/menu manipulation user input. The required solution should permit a unified touchscreen display capable of performing both regular use of the stylus as a pointing device from the user and text entry. The required solution should be intuitive and compatible with typical PID interfaces with which users have become familiar. The present invention provides a novel solution to the above requirements.

SUMMARY OF THE INVENTION

The present invention provides a solution that eliminates the requirement for dedicated areas on a touchscreen display or digitizer pad that partition text entry user input from icon/menu manipulation user input. The present invention permits a unified touchscreen display capable of performing both regular use of the stylus as a pointing device from the user and text entry. In addition, the present invention is intuitive and compatible with typical PID interfaces with which users have become familiar.

In one embodiment, the present invention is realized as a computer implemented method of generating a touchscreen user interface for a computer system. The touchscreen user interface functions by accepting user input on a PID, palmtop computer system, or other similar touchscreen equipped computing device (e.g., cellphone, etc.). With such a device, a touchscreen area is provided for accepting text input strokes and for accepting icon manipulation strokes, such as, for example, where a user taps, strokes, etc., the surface of the touchscreen with a stylus. In addition to the touchscreen, a sensor is disposed adjacent to the touch screen along an edge of the device. The sensor is a pressure sensitive device (e.g., a pressure sensor) along the edge of the device configured to register user actuations, such as where the user grasps the device more firmly. In implementing the user interface, user input strokes are registered and accepted into the touchscreen input area.

User input strokes into touchscreen input area are interpreted as text input strokes when the sensor is actuated by the user during the user input strokes. For example, to enter text characters, the user grasps the hand held device more firmly to steady the touchscreen as user input strokes are entered, and this firm grasp actuates the sensor disposed adjacent to the touchscreen (e.g., along the edge of the device). User input strokes into the touchscreen input area are interpreted as icon manipulation strokes and not text input strokes when the sensor is not actuated by the user during the user input strokes. For example, the user grasps the hand held device less firmly to perform icon manipulation strokes on the touchscreen. Icon manipulation strokes generally shorter and require less precision than text entry strokes, and hence, the proper operation of the sensor is intuitive. The nature of the sensor actuation is configured in order to require a deliberate touching, holding, grasping, or the like, to register an actuation of the sensor in order to distinguish between text input strokes and icon manipulation strokes, but not require so significant a user actuation as to interfere with a fluid and intuitive text entry process of the user. Interpreted input strokes can be rapidly displayed as characters on the touchscreen when the sensor is actuated by the user. An audible feedback can be generated to confirm the icon manipulation when the sensor is not actuated by the user. Similarly, a visual feedback can be generated to confirm the icon manipulation when the sensor is not actuated by the user.

In this manner, the present invention permits a unified touchscreen display capable of performing both regular use of the stylus as a pointing device from the user and text entry. The touchscreen display need not be partitioned into separate areas, thus making maximum use of the limited touchscreen size available for PIDs, palmtop computers, cellphones, and the like. In addition, the touchscreen user interface of the present invention is intuitive and compatible with typical PID interfaces and the fluid and intuitive text entry processes with which users have become familiar (e.g., grasping the hand held device more firmly and securely to perform text input strokes).

BRIEF DESCRIPTION OF THE DRAWINGS

The present invention is illustrated by way of example and not by way of limitation in the Figures of the accompanying drawings, in which like reference numerals refer to similar elements, and in which.

DETAILED DESCRIPTION OF THE INVENTION

In the following detailed description of the present invention, a method and system for a full screen user interface and data entry using sensors to implement handwritten glyphs, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to obscure aspects of the present invention unnecessarily.

Some portions of the detailed descriptions which follow are presented in terms of procedures, logic blocks, processing, and other symbolic representations of operations on data bits within a computer memory. These descriptions and representations are the means used by those skilled in the data processing arts to convey most effectively the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "implementing," "interpreting," "displaying," "configuring," "initializing," or the like, refer to the actions and processes of an embedded computer system, or similar embedded electronic computing device, that manipulates and transforms data represented as physical (electronic) quantities within the computer system's registers and memories into other data similarly represented as physical quantities within the computer system memories or registers or other such information storage, transmission or display devices.

The present invention is a method and system for a method and system for a full-screen user interface and data entry system. The present invention provides a solution that eliminates the requirement for dedicated areas on a touchscreen display or digitizer pad that partition text entry user input from icon/menu manipulation user input. The present invention permits a unified touchscreen display capable of performing both regular use of the stylus as a pointing device from the user and text entry. In addition, the present invention is intuitive and compatible with typical PID interfaces with which users have become familiar. Embodiments of the present invention and its benefits are further described below.

It should be noted that the method and system of the present invention can be adapted to provide a full-screen user interface and data entry system for a number of different types of touchscreen equipped computing devices. Such devices include, for example, personal information devices (PIDs), palmtop computing devices, handheld cellular telephones (cellphones) and other types of mobile telephones, alphanumeric paging devices, and the like, which are equipped with, or coupled to, a touchscreen display.

Figure 1:
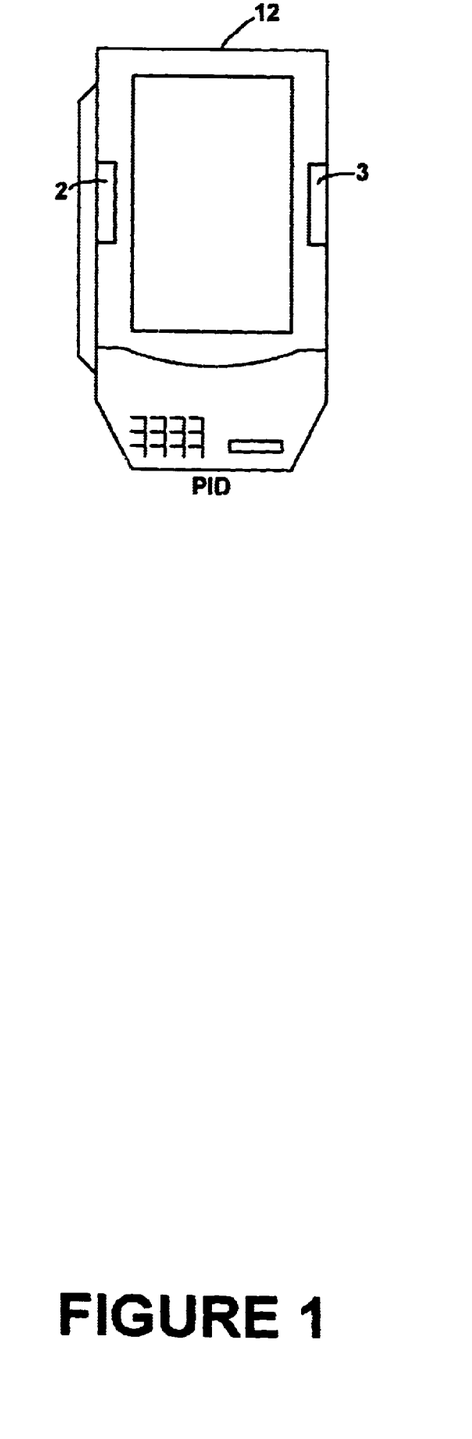
FIG. 1 is a diagram illustrating an exemplary preferred embodiment of the present system.

FIG. 1 shows an exemplary embodiment of a touchscreen equipped handheld PID 12 configured to provide a full-screen user interface and data entry system in accordance with the present invention. However, it should be noted that many touchscreen equipped electronic devices (e.g., digital cameras, pagers, palmtop computing devices, handheld cellular telephones (cellphones) and other types of mobile telephones, alphanumeric paging devices, and the like to be adapted to provide a full-screen user interface functionality of the present invention. As depicted in FIG. 1, PID 12 includes a touchscreen 16 for accepting input from a user, such as, for example, when the user touches or strokes touchscreen 16 with a stylus. PID 12 also includes a first sensor 2 and a second sensor 3 configured to register user actuations (e.g., grasping, pressing, etc. sensors 2–3).

Referring still to FIG. 1, in one embodiment, the present invention is realized as a computer implemented method of generating a touch screen user interface for a computer system. The touchscreen user interface functions by accepting user input on touchscreen 16 of PID 12. The touchscreen 16 is configured to register events and interpret the events as user input. As used herein, "events" refer to touches and/or strokes on the surface of touchscreen 16 of sufficient magnitude in order to be detected by the hardware comprising touchscreen 16. The hardware and software implementing the functionality of touchscreen 16 is configured for accepting text input strokes and for accepting icon manipulation strokes, such as, for example, where a user taps, strokes, etc., the surface of the touchscreen with a stylus. In implementing the user interface, PID 12 registers user input strokes on the touchscreen input area (i.e., touchscreen 16). PID 12 also includes first and second sensors 2–3 configured to register user actuations. In this embodiment, sensors 2–3 are pressure sensors configured to register an actuation when sensors 2–3 are pressed in excess of some threshold pressure, such as, for example, where the user grasps PID 12 more firmly (e.g., the firm grasping causing at least one of sensors 2–3 to register an actuation).

User input strokes into touchscreen 16 are interpreted as text input strokes and not icon manipulation strokes when the sensor is actuated by the user during the user input strokes. User input strokes into the touchscreen 16 are interpreted as icon manipulation strokes and not text input strokes when the sensor is not actuated by the user during the user input strokes.

The utilization of pressure type sensors for sensors 2–3 yields a more intuitive implementation of the user interface method of the present invention. For example, to enter text characters, the user grasps the hand held device more firmly to steady the touchscreen 16 as user input strokes are entered, and this firm grasp actuates at least one of sensors 2–3 disposed adjacent to the touchscreen 16 (e.g., along the edge of PID 12). For example, the user grasps PID 12 less firmly to perform icon manipulation strokes on the touchscreen 16. Icon manipulation strokes generally shorter and require less precision than text entry strokes, and hence, the proper operation of sensors 2–3 is intuitive. The nature of the sensor actuation is configured in order to require a deliberate touching, holding, grasping, or the like, to register an actuation in order to distinguish between text input strokes and icon manipulation strokes, but not require so significant a touching, grasping, etc. as to interfere with a fluid and intuitive text entry process of the user.

Referring still FIG. 1, interpreted input strokes can be rapidly displayed as characters on touchscreen 16 when one of sensors 2–3 is actuated by the user during the user input strokes. An audible feedback can be generated to confirm the icon manipulation when one of sensors 2–3 is not actuated by the user during the user input strokes. Similarly, a visual feedback can be generated to confirm the icon manipulation when one of sensors 2–3 is not actuated by the user during the user input strokes.

In this embodiment, two pressure sensors 2–3 are implemented, facilitating the use of PID 12 by both right-handed and left-handed users. It should be noted that an additional number of sensors can be implemented to provide a different degree of assessment of registration. Alternatively, a single sensor can be implemented, for example, to reduce complexity.

The sensitivity and functionality of sensors 2–3 can be configured using, for example, a configuration program showing configuration options/menus to the user on touchscreen 16. Such options/menus can allow the user to adjust the pressure required to register an actuation on sensors 2–3, or otherwise customize the interface.

Figure 2A:
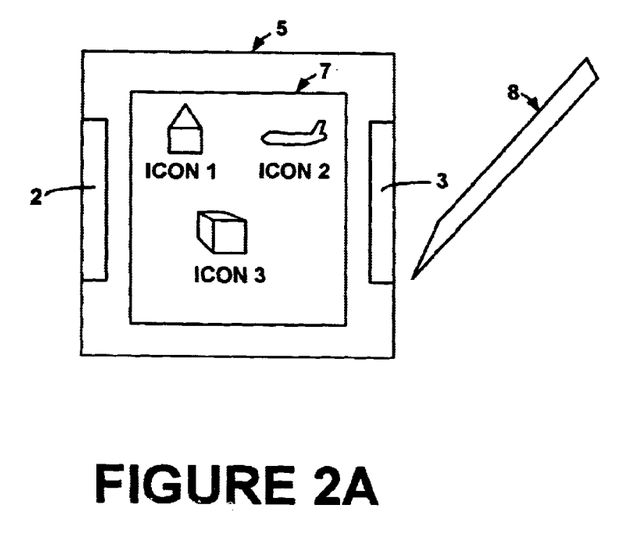
FIG. 2A shows a PID in accordance with a second embodiment of the present invention, wherein the size of the included touchscreen display is maximized with respect to the overall size of the PID.

FIG. 2A shows a PID 5 in accordance with a second embodiment of the present invention, wherein the size of the touchscreen display 7 is maximized with respect to the overall size of the PID 5 and stylus 8. Thus, as depicted in FIG. 2, the present invention permits a unified touchscreen display 7 capable of performing both icon/menu manipulation, such as, for example, selecting one or more of icons 1–3 shown on touchscreen display 7, and text entry. The touchscreen display 7 need not be partitioned into separate areas, thus making maximum use of the limited touchscreen size available for PIDs, palmtop computers, cellphones, and the like.

Figure 2B:
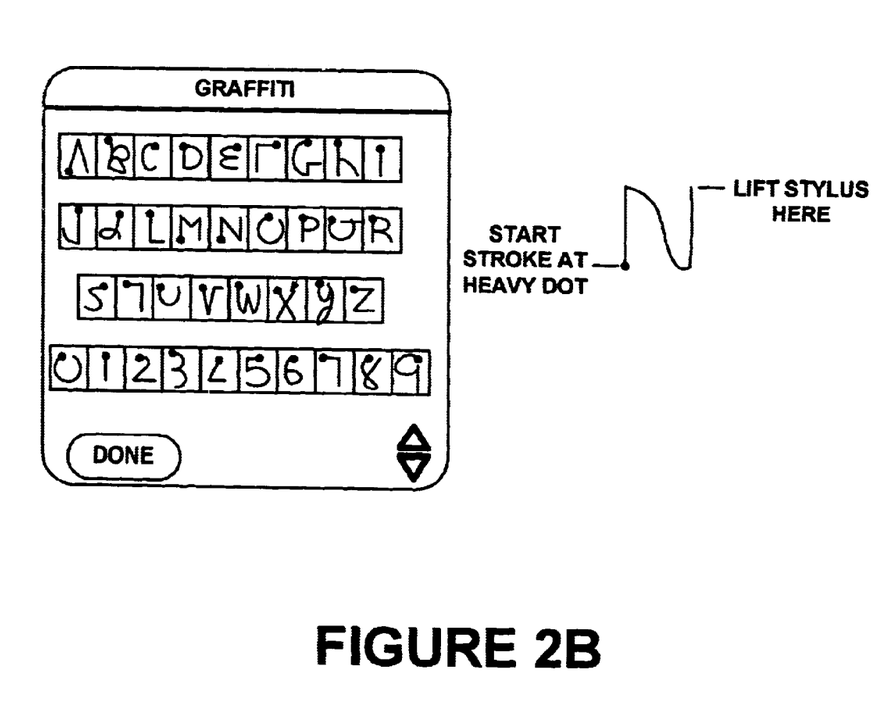
FIG. 2B shows a version of text entry glyphs compatible with the text entry process of the present invention and a diagram showing a typical user input stroke corresponding to a text character.

FIG. 2B shows a version of text entry glyphs compatible with the text entry process of the present invention and a diagram showing a typical user input stroke corresponding to the "n" text character. For example, to enter text characters, the user would manipulate the stylus 8 as shown. The stroke can be entered directly into the display 7. As the user performs the input stroke shown, the user firmly grasps PID 5 to actuate at least one of sensors 2–3, thus causing PID 5 to interpret the stroke as the "n" text character as opposed to a selection or manipulation of one of icons 1–3 shown in FIG. 2A.

Figure 3:
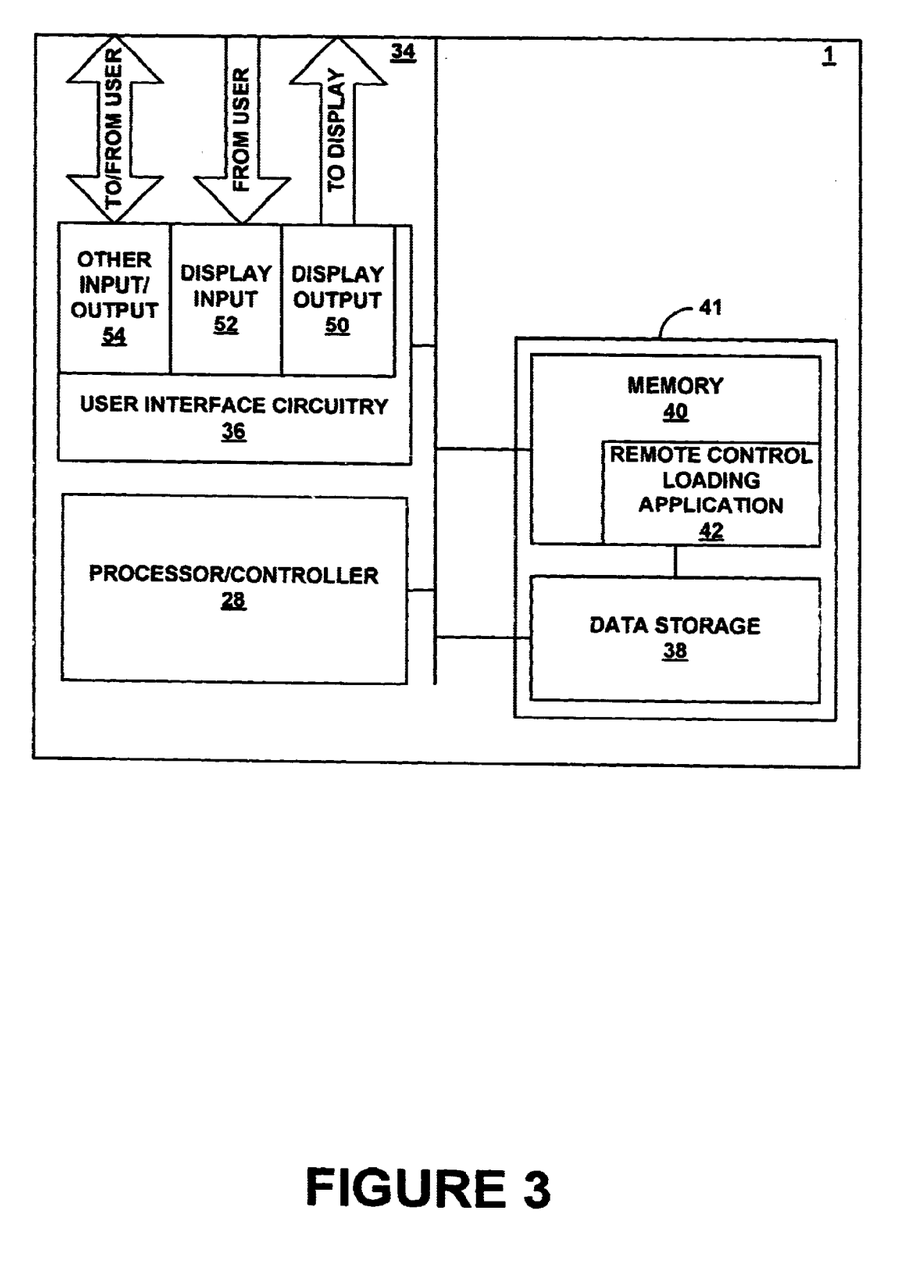
FIG. 3 is a function block diagram illustrating the internal components of an exemplary PID in accordance with one embodiment of the present invention.

FIG. 3 is a function block diagram showing the components of an exemplary embodiment of the PID 12. As depicted in FIG. 3, PID 12 includes a processor, or controller, 28 that is capable of executing software for controlling the functionality of touchscreen 16. Touchscreen 16 and sensors 2–3 communicate with data interface circuitry 26 through a bus 34. The processor 28 is also connected through the bus 34 to user interface circuitry 36, a data storage module 38 and memory 40. As used herein, the data storage module 38 and memory 40 may both generally be referred to as part of the PID memory 41.

The memory 40 may contain a specific remote control loading application 42. The remote control loading application 42 may operate, for example, after the processor 28 receives a user input touch commanding the loading of a certain software application (e.g., address book).

User interface circuitry 36 in the PID 12 includes hardware and software components that provide user input and output resources for functions in the processor 28. The user interface circuitry 36 includes display output 50, display input 52, and additional input/output interface circuitry 54.

The display output 50 preferably receives digital information representing graphical data from the processor 28 and converts the information to a graphical display, such as text and or/images, for display on touchscreen 16 (shown in FIG. 1). The display input 52 may receive data inputs, such as graphical data inputs, from a user of the PID 12. As described above, the graphical data inputs are preferably entered by the user with a stylus on touchscreen 16, and may include text, drawings, or other objects that are capable of being graphically presented.

Typically, the additional input/output interface 54 permits user input and commands to be input through buttons and similar devices on the PID, e.g., buttons for scrolling through data entries and activating applications. Alternatively, the input/output interface 54 may allow the PID 12 to accept audio data as well as other types of non-graphical data. For example, audio data signals (or picture telephone video input) may be entered through the additional input/output interface 54.

Figure 4:
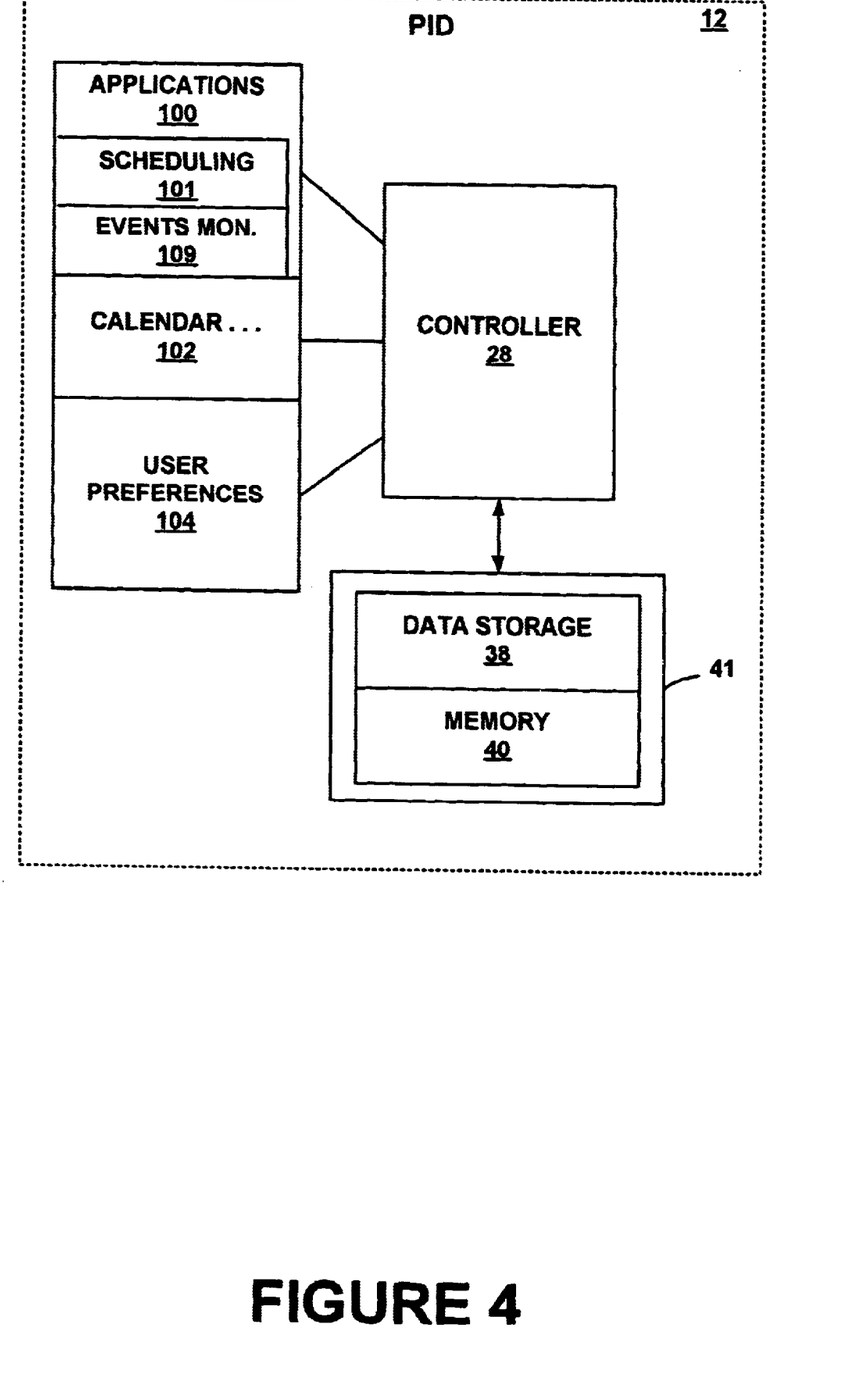
FIG. 4 shows resident software applications as hosted on a PID in accordance with one embodiment of the present invention.

As shown in FIG. 4, the PID 12 may include resident applications 100, such as, for example, a scheduling program 101 for managing schedule information. The PID 12 may include as well, for example, an events management program 109 for recording the start time and stop time of special events, a calendar program 102 for assisting in managing scheduling and events, and a user preferences program 104 for configuring PID 12 in accordance with the requirements of the user. The resident applications 100 respond to icon user input (e.g., the user touching graphically displayed buttons, menu items, or the like), or text input (e.g., the user "writing" address and contact information onto touchscreen 16 in response to a prompt from the calendar program 102).

Figure 5:
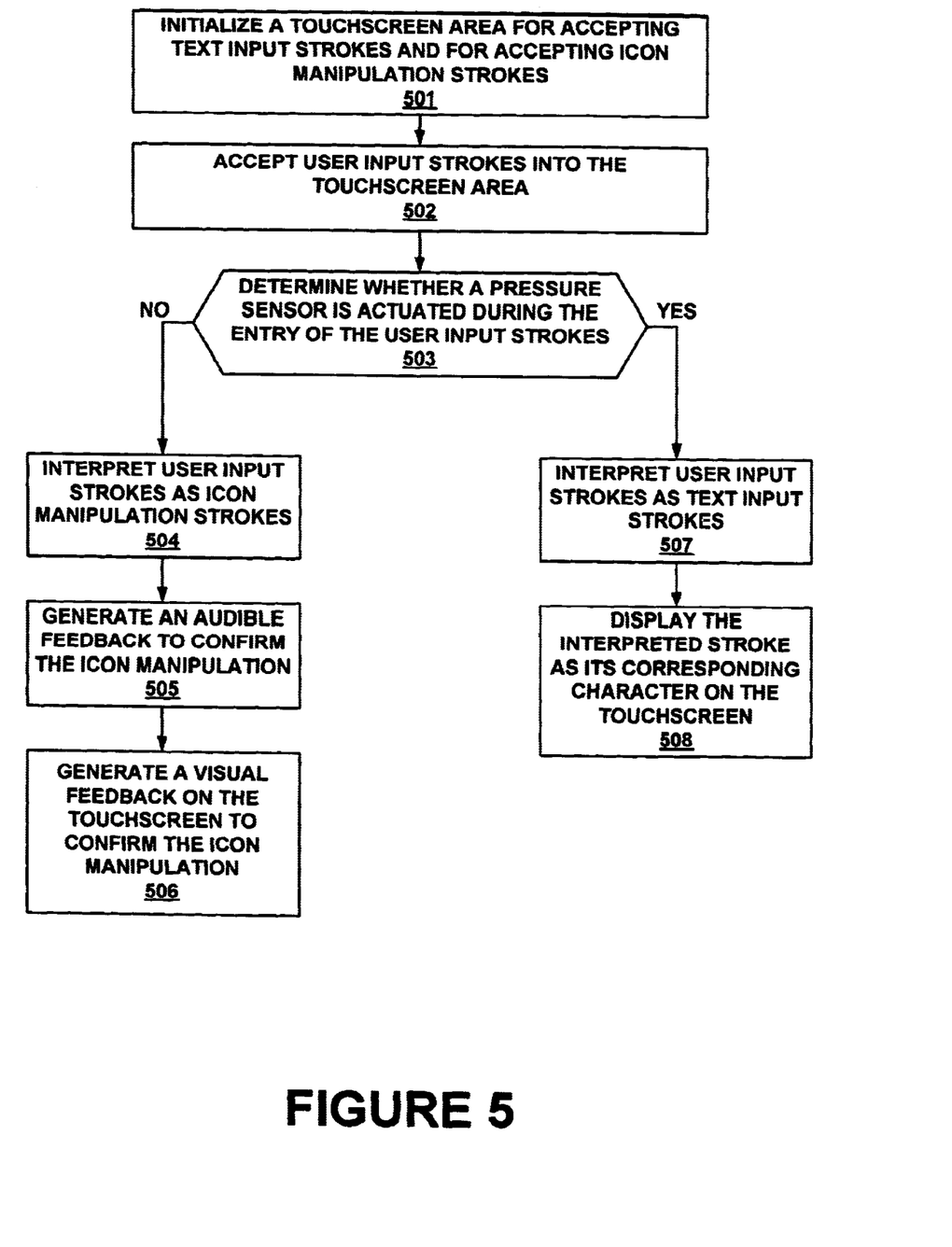
FIG. 5 shows a flowchart of the steps of a processor 500 in accordance with one embodiment of the present invention.

Referring now to FIG. 5, a flowchart of the steps of a process 500 in accordance with one embodiment of the present invention is shown. Process 500 shows the operating steps of the user interface process of the present invention as implemented on PID 12 of FIG. 1.

Process 500 begins in step 501 where touchscreen 16 of PID 12 is initialized to accept text input strokes and to accept icon manipulation strokes of a user. The initialization occurs when, for example, PID 12 is turned on. In step 502, PID 12 receives user input strokes on the surface of touchscreen 16. In step 503, PID 12 determines whether at least one of sensors 2–3 is pressed, grasped, held, etc. significantly enough to register an actuation. As described above, the nature of the sensor actuation is configured to require a deliberate touching, holding, grasping, or the like, to register an actuation of the sensor in order to distinguish between text input strokes and icon manipulation strokes, but not require so significant a user actuation as to interfere with a fluid and intuitive text entry process of the user. In one embodiment, the amount of pressure required to register an actuation is adjustable by the user.

Referring still to process 500 of FIG. 5, in step 504, when the sensor is not actuated by the user during the user input stroke, the user input stroke is interpreted as an icon manipulation stroke. In step 505, an audible feedback is generated to audibly confirm the icon manipulation to the user. Implementation of this feature can be optional and user configurable. In step 506, a visual feedback on touchscreen 16 is generated to visually confirm the icon manipulation to the user. In step 507, when the sensor is actuated by the user during the user input stroke, the user input stroke is interpreted as a text input stroke. Subsequently, in step 508, the interpreted input stroke is displayed as its corresponding character on touchscreen 16.

Thus, the present invention is a method and system for a method and system for a full-screen user interface and data entry system. The present invention provides a solution that eliminates the requirement for dedicated areas on a touchscreen display or digitizer pad that partition text entry user input from icon/menu manipulation user-input. The present invention permits a unified touchscreen display capable of performing both icon/menu manipulation and text entry. In addition, the present invention is intuitive and compatible with typical PID interfaces with which users have become familiar.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A computer implemented method of implementing a touch screen user interface for a computer system, said method comprising the steps of:

providing touchscreen area for accepting text input strokes and for accepting icon manipulation strokes;

providing a sensor adapted to detect a grasp pressure adjacent to the touchscreen area for registering an actuation by a user;

accepting user input strokes into the touchscreen area;

interpreting user input strokes into the touchscreen area as text input strokes when the sensor is actuated by the user; and interpreting user input strokes into the touchscreen area as icon manipulation strokes and not text input strokes when the sensor is not actuated by the user.

2. The method of claim 1 wherein said steps of interpreting user input strokes include immediately recognizing a character after said user completes at least one stroke that defines the character and when the sensor is actuated by the user.

3. The method of claim 1 wherein the step of interpreting user input strokes into the touchscreen area as icon manipulation strokes includes generating an audible feedback to confirm the icon manipulation when the sensor is not actuated by the user.

4. The method of claim 1 wherein the step of interpreting user input strokes into the touchscreen area as icon manipulation strokes includes generating a visual feedback on the touchscreen area to confirm the icon manipulation when the sensor is not actuated by the user.

5. The method of claim 1 further comprising the step of displaying an interpreted input stroke as a character onto a display when the sensor is actuated by the user.

6. The method of claim 1 wherein the touchscreen area is provided on a PID (personal information device).

7. The method of claim 1 wherein the touchscreen area is provided on a palmtop computer system.

8. A computer implemented method of implementing a user interface for a computer system, said method comprising the steps of:

providing a user input area for accepting text input strokes and for accepting icon manipulation strokes;

providing a sensor adapted to detect a grasp pressure adjacent to the user input area for registering an actuation by a user;

accepting user input strokes into the user input area;

interpreting user input strokes into the user input area as text input strokes when the sensor is actuated by the user; and interpreting user input strokes into the user input area as icon manipulation strokes and not text input strokes when the sensor is not actuated by the user.

9. The method of claim 8 wherein the user input area is a touchscreen.

10. The method of claim 8 wherein the user input area is a digitizer pad.

11. The method of claim 8 wherein said steps of interpreting user input strokes include immediately recognizing a character after said user completes at least one stroke that defines the character and when the sensor is actuated by the user.

12. The method of claim 8 wherein the step of interpreting user input strokes into the user input area as icon manipulation strokes includes generating an audible feedback to confirm the icon manipulation when the sensor is not actuated by the user.

13. The method of claim 8 wherein the step of interpreting user input strokes into the user input area as icon manipulation strokes includes generating a visual feedback on the touchscreen to confirm the icon manipulation when the sensor is not actuated by the user.

14. The method of claim 8 further comprising the step of displaying an interpreted input stroke as a character onto a display when the sensor is actuated by the user.

15. The method of claim 8 wherein the user input area is provided on a PID (personal information device).

16. The method of claim 8 wherein the user input area is provided on a palmtop computer system.

17. A touchscreen equipped computer apparatus, comprising:

a touchscreen area for accepting text input strokes and for accepting icon manipulation strokes;

a sensor adapted to detect a grasp pressure adjacent to the user input area for registering an actuation by a user; and a computer system coupled to the touchscreen area, the computer system configured to implement the steps of:

accepting user input strokes into the touchscreen area;

interpreting user input strokes into the touchscreen area as text input strokes when the sensor is actuated by the user; and interpreting user input strokes into the touchscreen area as icon manipulation strokes and not text input strokes when the sensor is not actuated by the user.

18. The apparatus of claim 17 wherein said steps of interpreting user input strokes include immediately recognizing a character after said user completes at least one stroke that defines the character and when the sensor is actuated by the user.

19. The apparatus of claim 17 wherein the step of interpreting user input strokes into the touchscreen area as icon manipulation strokes includes generating an audible feedback using a speaker coupled to the computer system to confirm the icon manipulation when the sensor is not actuated by the user.

20. The apparatus of claim 17 wherein the step of interpreting user input strokes into the touchscreen area as icon manipulation strokes includes generating a visual feedback on the touchscreen area to confirm the icon manipulation when the sensor is not actuated by the user.

\* \* \* \* \*